(12) United States Patent
Margot et al.

(10) Patent No.: US 11,726,656 B2
(45) Date of Patent: Aug. 15, 2023

(54) INTELLIGENT KEYBOARD

(71) Applicant: Keys, Inc, Fort Collins, CO (US)

(72) Inventors: Taylor Margot, Fort Collins, CO (US); John Peterson, Pittsboro, NC (US); David Blanchard, Missoula, MT (US)

(73) Assignee: Keys, Inc., Missoula, MT (US)

(*) Notice: Subject to any disclaimer, the term of this patent is extended or adjusted under 35 U.S.C. 154(b) by 0 days.

(21) Appl. No.: 17/592,414

(22) Filed: Feb. 3, 2022

(65) Prior Publication Data

US 2022/0244847 A1    Aug. 4, 2022

Related U.S. Application Data

(60) Provisional application No. 63/145,881, filed on Feb. 4, 2021.

(51) Int. Cl.
*G06F 3/04895* (2022.01)
*G06F 3/04886* (2022.01)
(Continued)

(52) U.S. Cl.
CPC ...... *G06F 3/04895* (2013.01); *G06F 3/04886* (2013.01); *G06F 16/3344* (2019.01); *G06F 40/274* (2020.01); *H04L 51/046* (2013.01)

(58) Field of Classification Search
CPC ............ G06F 3/04895; G06F 3/04886; G06F 16/3344; G06F 40/274; H04L 51/046; H04L 51/18; H04L 51/02
See application file for complete search history.

(56) References Cited

U.S. PATENT DOCUMENTS 6,480,587 B1    11/2002  Rao et al.
9,213,941 B2    12/2015  Petersen
(Continued)

FOREIGN PATENT DOCUMENTS

EP    2972691 B1    1/2016
EP    3324581 B1    5/2018

OTHER PUBLICATIONS

Toon, "Self-powered intelligent keyboard could provide a new layer of security." Georgia Institute of Technology. Jan. 22, 2015 from https://research.gatech.edu/self-powered-intelligent-keyboard-could-provide-new-layer-security.

*Primary Examiner* — Md Saiful A Siddiqui
(74) *Attorney, Agent, or Firm* — McConnell Law Firm, P.C.; Robert McConnell

(57) ABSTRACT

An intelligent keyboard for mobile devices and other computer devices. This intelligent keyboard provides the user with suggestions of relevant words or phrases that can be used to start or continue a conversation on text message, email and/or various web applications. The intelligent keyboard provides conversation suggestions that are appropriate for given application contexts, categories, and conversation types. The intelligent keyboard uses user generated content from application users, usage history, profile data, dialogue data, platform generated content from the system managers/ owners, content collected from various websites/integrations and natural language content generated by artificial intelligence. Content is ranked by preference, contextual suitability, and performance. Content is further tagged for application context. User behavior, user data and artificial intelligence models continuously update the system so that the relevance and performance of keyboard content is optimized.

12 Claims, 16 Drawing Sheets

(51) Int. Cl.
*G06F 16/33* (2019.01)
*G06F 40/274* (2020.01)
*H04L 51/046* (2022.01)

(56) References Cited

U.S. PATENT DOCUMENTS

| | | | |
|---|---|---|---|
| 9,244,905 B2 | 1/2016 | Joshi et al. | |
| 9,461,945 B2 | 10/2016 | Phillips | |
| 9,883,358 B2 | 1/2018 | Kalkounis et al. | |
| 9,990,052 B2 | 6/2018 | Kuo et al. | |
| 10,031,908 B2 | 7/2018 | Smadja et al. | |
| 10,063,497 B2 | 8/2018 | Snider et al. | |
| 10,162,816 B1 | 12/2018 | Banerjee et al. | |
| 10,305,828 B2 | 5/2019 | Cao et al. | |
| 10,380,261 B2 | 8/2019 | Doggett | |
| 10,387,461 B2 | 8/2019 | Sharifi et al. | |
| 10,430,045 B2 | 10/2019 | Baek | |
| 10,521,484 B1 | 12/2019 | Ghassemi Hamadani et al. | |
| 10,601,739 B2 | 3/2020 | Patil | |
| 10,606,477 B1* | 3/2020 | Donnici | G06F 40/274 |
| 10,785,173 B2 | 9/2020 | Willett et al. | |
| 10,803,244 B2 | 10/2020 | Lindsay et al. | |
| 10,809,914 B2 | 10/2020 | Clements et al. | |
| 10,965,622 B2 | 3/2021 | Kim et al. | |
| 11,030,515 B2 | 6/2021 | Kaufmann et al. | |
| 11,120,220 B2 | 9/2021 | Chaudhri et al. | |
| 11,134,034 B2 | 9/2021 | Goslin et al. | |
| 2008/0092087 A1 | 4/2008 | Brown et al. | |
| 2008/0133488 A1 | 6/2008 | Bandaru et al. | |
| 2014/0337451 A1* | 11/2014 | Choudhary | H04L 51/52 709/206 |
| 2016/0218997 A1 | 7/2016 | Patil | |
| 2016/0224524 A1 | 8/2016 | Kay et al. | |
| 2016/0371250 A1 | 12/2016 | Rhodes | |
| 2017/0102870 A1* | 4/2017 | Won | G06F 3/0481 |
| 2017/0206194 A1* | 7/2017 | Lindsay | G06F 16/334 |
| 2017/0357443 A1 | 12/2017 | Paek et al. | |
| 2018/0239770 A1 | 8/2018 | Ghotbi et al. | |
| 2020/0225908 A1* | 7/2020 | Lee | G10L 15/26 |
| 2021/0312487 A1* | 10/2021 | Pena | G06K 9/6256 |

\* cited by examiner 79　　　　　　　　　　80　　　　　　　　　　81

79　　　　　　　　　　82　　　　　　　　　　83

INTELLIGENT KEYBOARD

BACKGROUND OF THE INVENTION

Field of the Invention

The present invention relates to an intelligent keyboard that provides suggested phrases to start conversations on computing devices. Electronic communication via texting, iMessage, email, Slack, Microsoft Teams, dating applications and many other applications has become extremely common place in today's virtual world. While word suggestions, auto-complete and auto-correction are well known in today's mobile devices such as Apple's iPhone, Google's Android devices and various laptop/desktop computer application, today's devices do not suggest entire phrases to start conversations based on the category of conversation and intent of the user. The present invention relates to intelligent keyboards for installation on mobile operating systems like Apple iOS and Google Android, or on desktop/laptop operating systems like Apple MacOS, Microsoft Windows, Linux and Unix.

SUMMARY OF THE INVENTION

The present invention is an intelligent keyboard for mobile devices. This intelligent keyboard provides the user with suggestions of relevant words or phrases that can be used to start or continue a conversation on text message, email and/or various web applications. The intelligent keyboard provides conversation suggestions that are appropriate for given application contexts, categories and conversation types. The intelligent keyboard uses user generated content from application users, usage history, profile data, dialogue data, platform generated content from the system managers/owners, content collected from various websites/integrations and natural language content generated by artificial intelligence. Content is ranked by preference, contextual suitability and performance. Content is further tagged for application context. User behavior, user data and artificial intelligence models continuously update the system so that the relevance and performance of keyboard content is optimized.

BRIEF DESCRIPTION OF THE DRAWINGS

FIG. 6 is a block diagram of the matching algorithm.

DESCRIPTION OF THE PREFERRED EMBODIMENT

The following detailed description refers to the preferred embodiment of the disclosed invention as shown in the attached figures and in the below description. This detailed description is not meant to limit the scope of the invention in any way but is intended to disclose the preferred embodiment/best mode of the invention at the time of filing this application.

Figure 1:
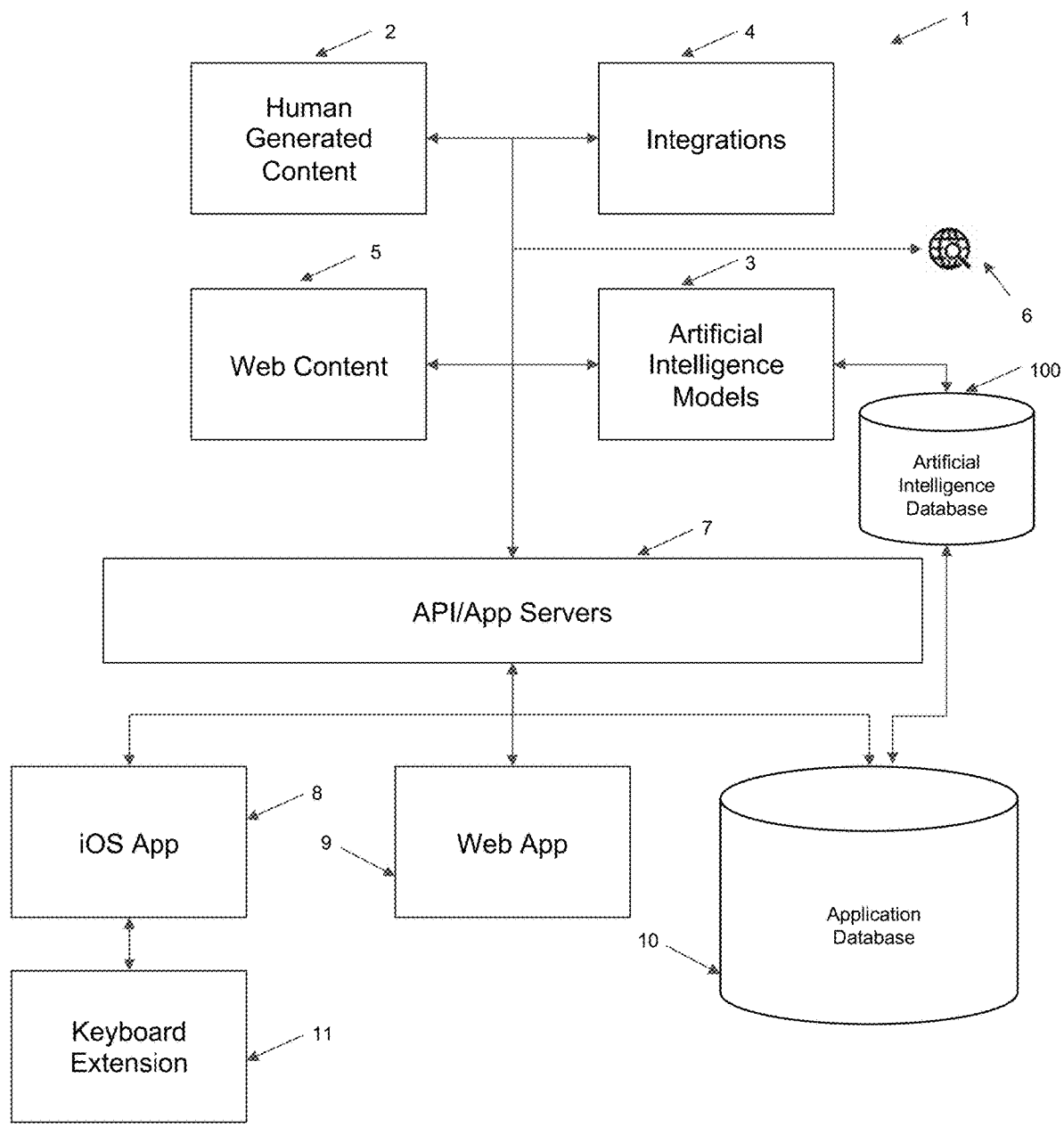
FIG. 1 is a block diagram of the intelligent keyboard system.

FIG. 1 shows a block diagram of the complete intelligent keyboard system 1. The major components of the system include Human Generated Content 2. This block selects, ranks and stores content created by humans for the system, both platform owners and users. Integrations 4 functions to capture content from other applications and websites utilized by the user on their particular mobile device. Artificial Intelligence Models 3 provides logic and connectivity to models that have been trained using machine learning. Artificial intelligence models are defined as any function that has been trained by one or more machine learning algorithms using data. These models can be trained by third parties, by the patent holders or some combination thereof. Artificial intelligence database 100 is the stored, structured data used to create, manage, train, deploy and maintain artificial intelligence models 3. Web content 5 identifies and collects relevant information from third party websites that is utilized within the platform. The platform is connected to the internet 6. API/App Servers 7 provides application servers that control the platform and various functions as well as application programming interfaces (API) to various third party functionality. iOS app 8 is the iOS application that is installed on the user device. This application controls keyboard extension 11 which is the actual intelligent keyboard on the user's device. Web application 9 allows the platform owner to make configuration changes to the system. Lastly, database 10 stores all the keyboard content, user profiles and configurations for the platform. The intelligent keyboard disclosed in this application suggests and sends messages suggested to the user. In the preferred embodiment, messages are in the form of a complete phrase, but for purposes of this application a message is defined as any combination of one or more characters that may or may not form a word or phrase.

Figure 2:
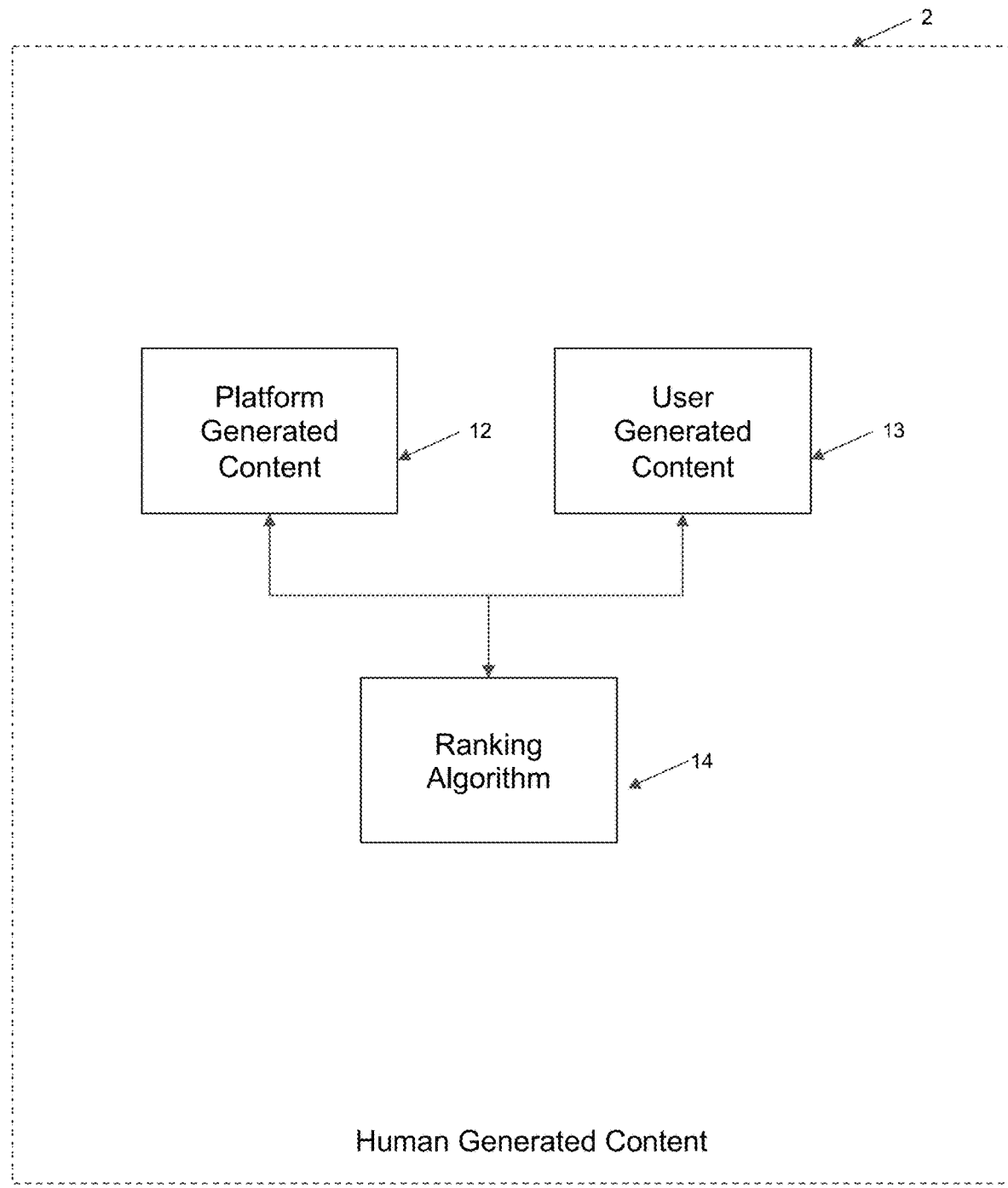
FIG. 2 is a block diagram of the human generated content module.

FIG. 2 shows a detailed block diagram of Human Generated Content 2. In platform generated content block 12, platform owner and/or operator generates and stores specific keyboard content written for the platform. This includes specific phrases that are appropriate for specific contexts such as dating applications, texting, email, slack and social media. An example of this content might include editorially driven and tested conversation starters for dating applications. Such content is developed to match a variety of situations, user content (from the context of the conversation, i.e. dating, email, text, Slack and social media) and user tones.

Phrases on the platform are also organized by Category. Categories include Favorites, Advice, Openers, Banter, Connect/Disconnect and others. Under each Category, there are several conversation types, known as Intents. These Intents include, but are not limited to, curious, ridiculous, flirty, dog, nature, challenge, basic, date at home and today. These are examples of Categories and Intents included in the preferred embodiment, but any number of additional categories or types are anticipated in the invention. Under each Category, several complete phrases are provided to start or continue specific conversations.

The keyboard is designed to be an intent-based communication assistant. The purpose of the keyboard is to assist a user who has an idea of what they want to say, i.e. an intent, but not the specific words to make the statement. In this situation, the user can tap an intent and be presented with a list of content to choose from, and messages to send. The user can then choose the content they prefer and send the message populated with the chosen content.

The message lifecycle, i.e. the cognitive steps for sending a message, is generally the same for each message. The user's cognitive steps for each message are: (1) determine intent for the message, (2) develop specific words that express the intent, (3) type those letters/words, (4) edit and (5) send the message. The intelligent keyboard simplifies steps 2 through 5 of the process. Using the intelligent keyboard, the user can start with an intent and skip directly to sending an appropriate message User generated content 13 includes content generated by users on the platform. The platform collects and tags content generated by all the users on the platform and utilizes ranking algorithm 14 to determine the top performing phrases across the platform. Phrase performance on the platform is determined by a number of factors, including category views, interaction frequency for each category, phrase views, phrase sends, peak usage times (by day of week and time of day), user voting on content by an up or down vote and many other factors. Top performing phrases are published across the platform so that any user can access the phrase from the keyboard as a conversation suggestion.

For purposes of this application, message data means any amount of data, no matter how large or small, that forms all or part of a message. Message data stored in human generated content 2 is stored in structured databases well known in the art. These structured databases allow easy search, location and access to message data utilized on the platform. Part or all of these databases may be stored on remote servers or on the user's local device, depending on the configuration of the software and other factors such as frequency of access by user, and speed of data access required.

Figure 3:
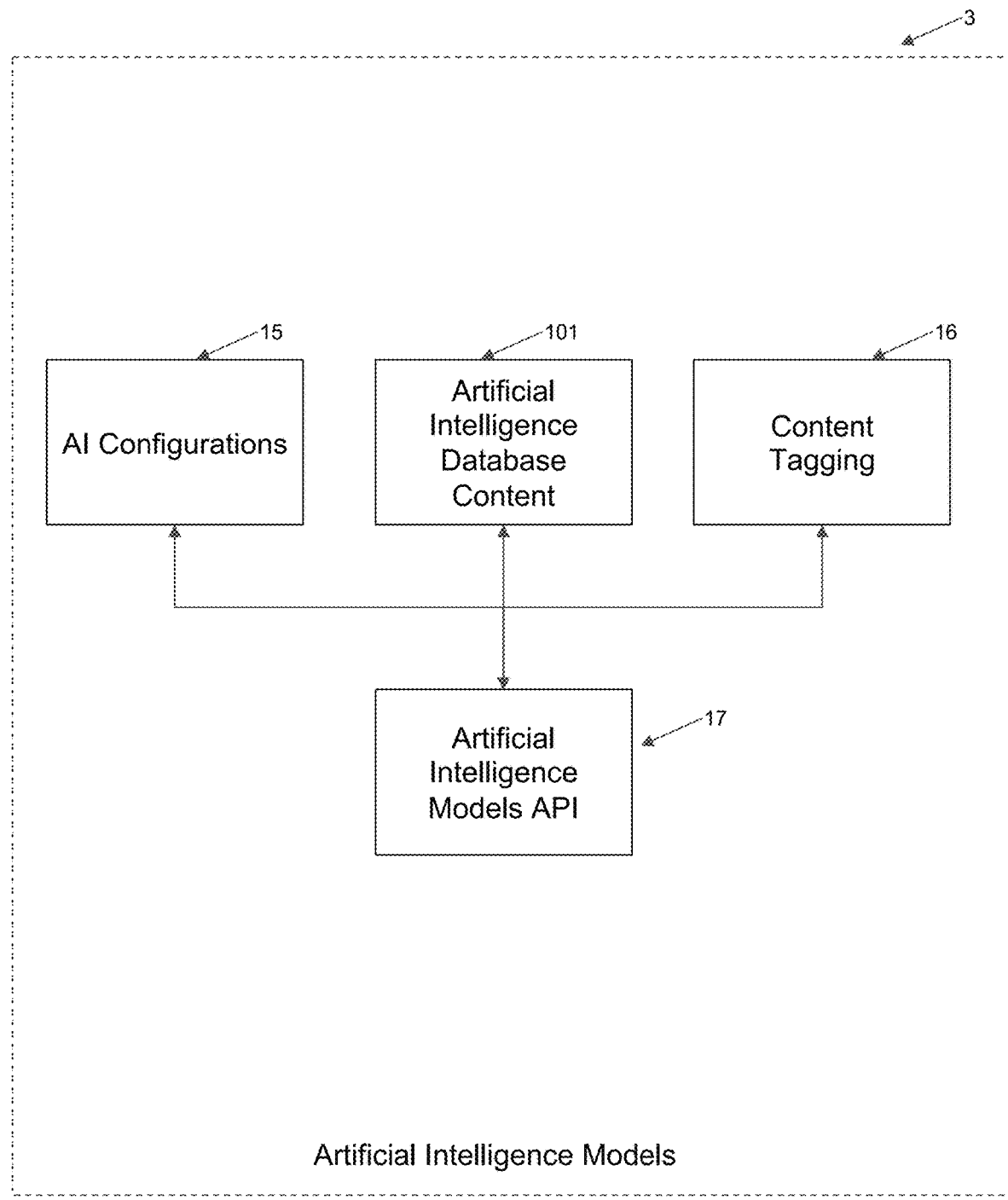
FIG. 3 is a block diagram of the Artificial Intelligence Models module.

FIG. 3 shows a block diagram of Artificial Intelligence Models functionality: AI configuration 15, content tagging 16, Artificial Intelligence Database Content 101 from the Artificial Intelligence Database 100 and Artificial Intelligence Models API 17. AI configuration 15 sets the general configuration options sending content and receiving predictions from Artificial Intelligence Models. These configurations include but are not limited to: human-generated context, meta parameters for AI generated content, user profiles, processing content (both human- and AI-generated), and applying meta tags relating to the subject, tone and structure of the content. The platform owners may update these configurations from time to time to optimize the performance of the artificial intelligence algorithm(s) in the Artificial Intelligence Models 17.

The type of artificial intelligence used in this system is utilized for language tasks in natural language processing, such as classification, part-of-speech tagging and text generation. Specifically, when a set of words or a phrase is sent to the AI API, one or more Artificial Intelligence Models will return the most appropriate set of words or phrases in response to what is sent relative to the configurations set in AI configuration 15. In this way, the AI can generate sentences that, in context, mimic a normal human conversation. This AI generated content is constantly tagged, categorized and saved. The present system uses this natural language capability to generate conversation content and responses that are presented in the intelligent keyboard. The system further uses AI in content tagging 16 to tag keyboard phrases with various keywords that allow the system to present the most effective phrases for a given context on a user keyboard.

Artificial Intelligence Models API 17 provides an API connection for the platform to communicate with Artificial Intelligence Models 3. Artificial Intelligence Models API 17 receives specific configurations and content. They return generated text, classifications, tags and other content. For example, if "How are you?" is sent to the Artificial Intelligence Models API, it might respond "I am doing well, thank you." The Artificial Intelligence Models use content to optimize such natural language responses so that they seem as close to human conversation as possible. The intelligent keyboard uses such natural language AI responses to generate phrases for the keyboard.

Generally an application programming interface (API) is queried by sending data structured in a specific format to the API. Upon receipt of such an appropriately formed API request, an API will process the request and return data as an output. Content received by the Artificial Intelligence Models API can include configuration data that is needed by Artificial Intelligence Models 3 to generate a response, including dialogue history, profile data, and other data used by the Artificial Intelligence Models 3 to generate predictions. Predictions can take the form of: 1) classifications, 2) text responses such as single words, phrases, sentences or paragraphs, or 3) vectors, tensors and other mathematical objects.

Message data stored in artificial intelligence models 3 is stored in structured databases well known in the art. These structured databases allow easy search, location and access to message data utilized on the platform. Part or all of these databases may be stored on remote servers or on the user's local device, depending on the configuration of the software and other factors such as frequency of access by user, and speed of data access required.

Figure 4:
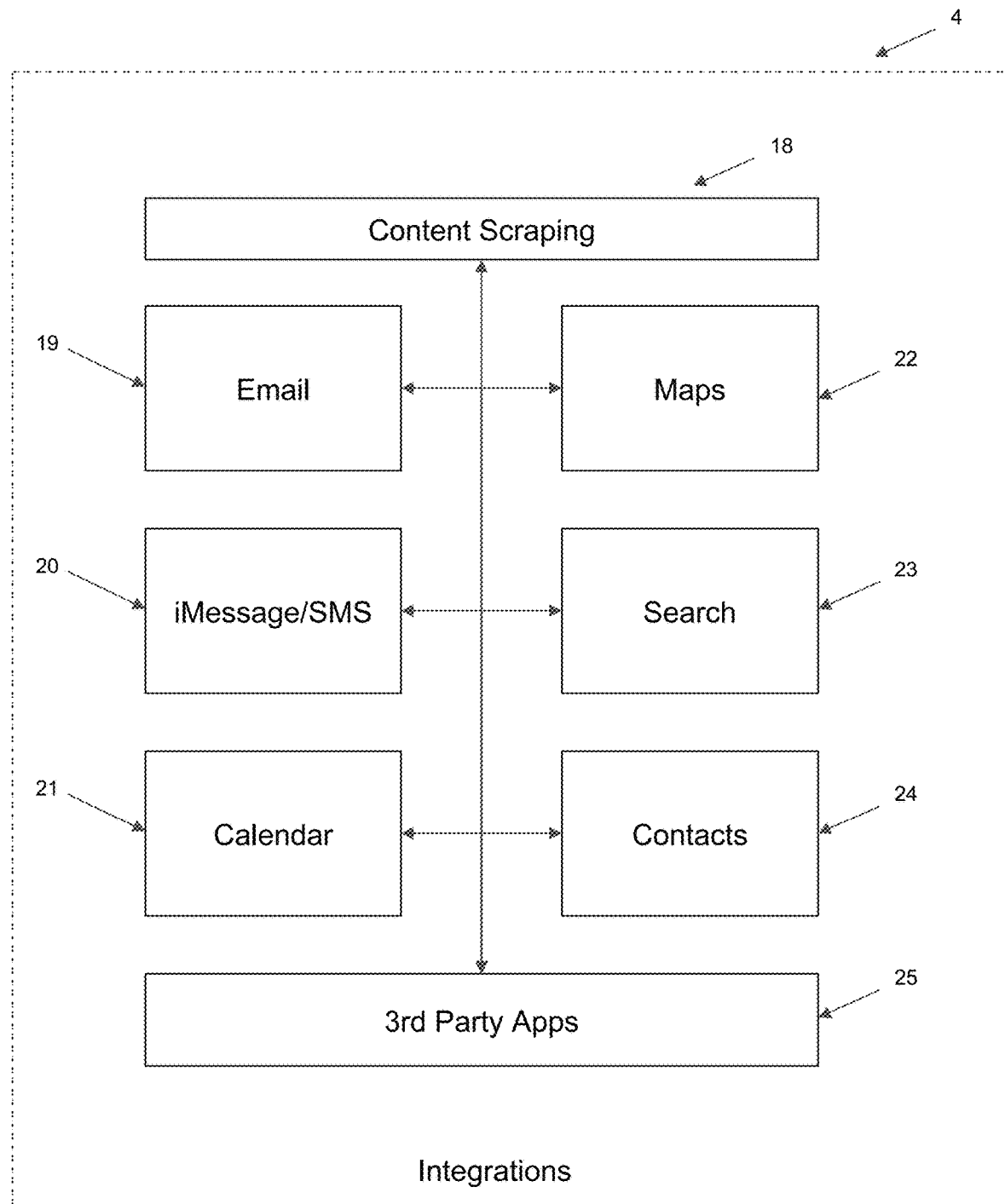
FIG. 4 is a block diagram of the integrations module.

FIG. 4 shows a detailed view of integrations 4. Integrations 4 assists the system in learning the user's language style by analyzing the user's actual use of language on their mobile device. In the preferred embodiment, the mobile device is an Apple iOS device (iPhone or iPad) but the disclosed system and method could be used on any type of mobile device, particularly those running Google's Android mobile operating system. The system collects the user's content from applications and integrations on their mobile phone. The system takes such content, particularly conversation style and content, and processes it to assist the system in mimicking the user's natural language style.

Content scraping 18 includes the code and logic to collect and process content from the user's mobile device. Content scraping 18 is designed to take collected content from various different applications and integrations, then structure and tag the content in a consistent manner so it can be utilized across the intelligent keyboard application. The logic in content scraping 18 is developed with the specific applications/integrations disclosed in this preferred embodiment but could be extended to include nearly any application or integration that is added to the intelligent keyboard product in the future.

Email integration 19 allows the system to collect conversation from the user's email application to determine their language style. Such email applications include the native iOS mail application as well as other third-party email applications such as Gmail. Email is an excellent location to collect data about a user's conversational style and content, so it is a primary data source for the intelligent keyboard application. While email tends to be longer form conversation, iMessage or SMS tends to show a user's conversational style for shorter form conversation. For this purpose, iMessage/SMS integration 20 collects conversational data from the user's Apple iMessage and/or text message accounts. This conversational data is vitally important for the intelligent keyboard application because it reveals the user's style and content for shorter form content.

Calendar 21, maps 22, search 23 and contacts 24 collect data from the calendar app, map app, search engines and contacts applications respectively. These apps provide useful structural data to enhance the system's understanding of the user's conversational style and content, but also location data, search history and frequent contacts. In the preferred embodiment, the intelligent keyboard is able to use the enhanced context provided by calendar 21, maps 22, search 23 and contacts 24 to add events to a user's preferred calendar application without leaving the intelligent keyboard.

Third-party apps 25 allows the system to collect data from specific third-party apps such as Yelp, Foursquare, Opentable, Calendly, Instagram, or Facebook to provide hyper specific content, recommendations, opportunities or offers relevant to the user. While the preferred embodiment of the disclosed invention includes integrations with these third-party apps, many other could be included and are consistent with the invention disclosed here.

Message data stored in integrations 4 is stored in structured databases well known in the art. These structured databases allow easy search, location and access to message data utilized on the platform. Part or all of these databases may be stored on remote servers or on the user's local device, depending on the configuration of the software and other factors such as frequency of access by user, and speed of data access required.

Figure 5:
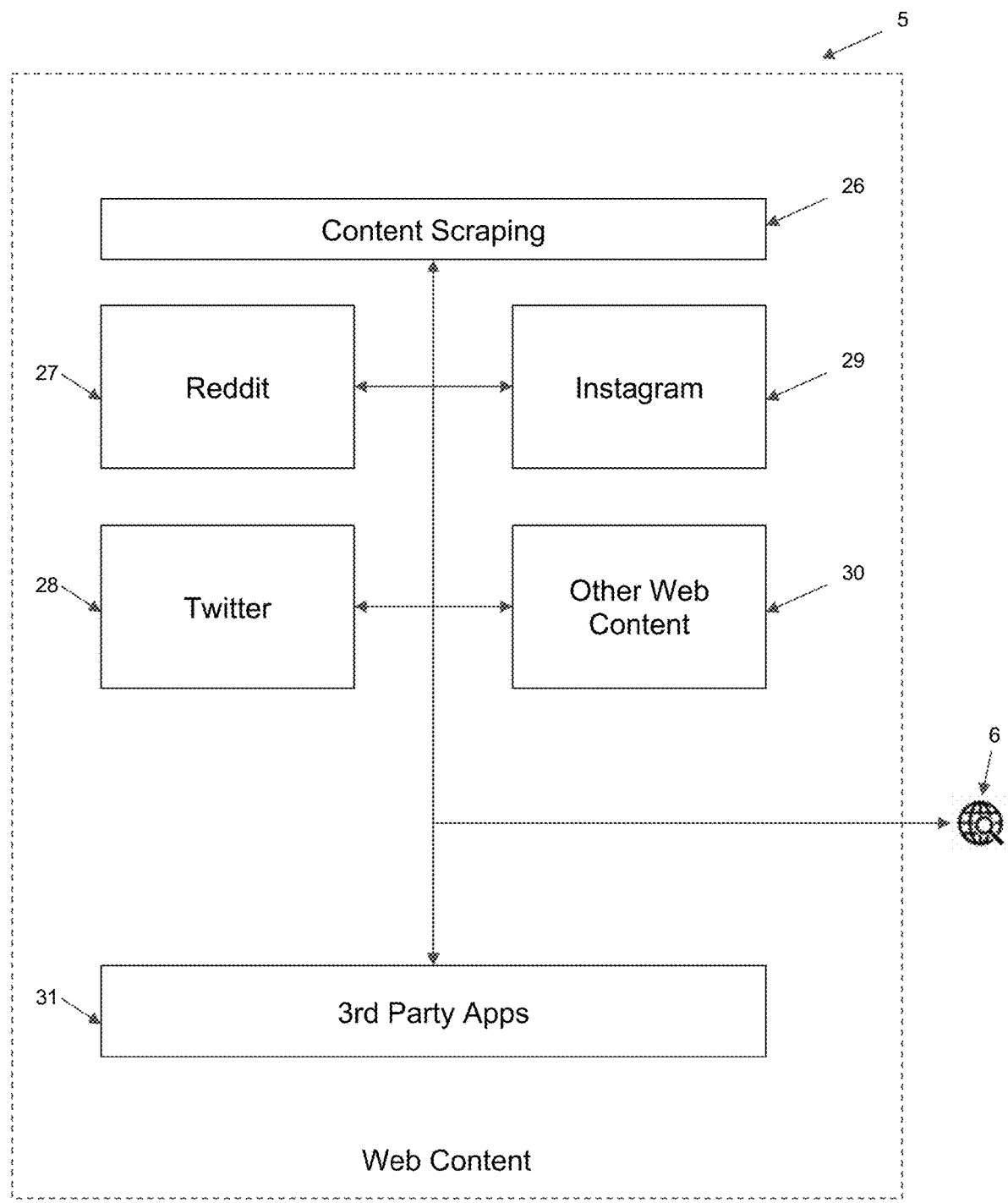
FIG. 5 is a block diagram of the web content module.

FIG. 5 shows a detailed block diagram of web content 5. Similarly to integrations 4, the purpose of web content 5 is to collect conversational information from major websites using publicly available APIs. While integrations 4 is focused on the specific user's conversational style and content, web content 5 focuses more broadly on general conversational content and style utilized by the general public on key websites. Similarly to integrations 4, this content is collected (scraped) from public websites, then consistently tagged and categorized so that it can be utilized in the intelligent keyboard application.

Content scraping 26 is a code block designed to capture, process and tag content collected via public API from key websites. The key function is to capture unstructured content data, then process it into a structured dataset that can be utilized to populate the intelligent keyboard with useful content for given user contexts. In the preferred embodiment, this functionality is optimized for sites like Reddit 27, Twitter 28 and Instagram 29, but also includes other web content 30 and third-party apps 31. Many websites with or without public APIs are envisioned by the present invention. Reddit, Twitter and Instagram all support public APIs that allow the system to make structured data requests of those platforms so that conversational and other data can be captured and processed for the intelligent keyboard product. Web content 5 is connected to the internet 6. As described in relation to other message data, web content 5 is stored in databases well known in the art.

Figure 6:
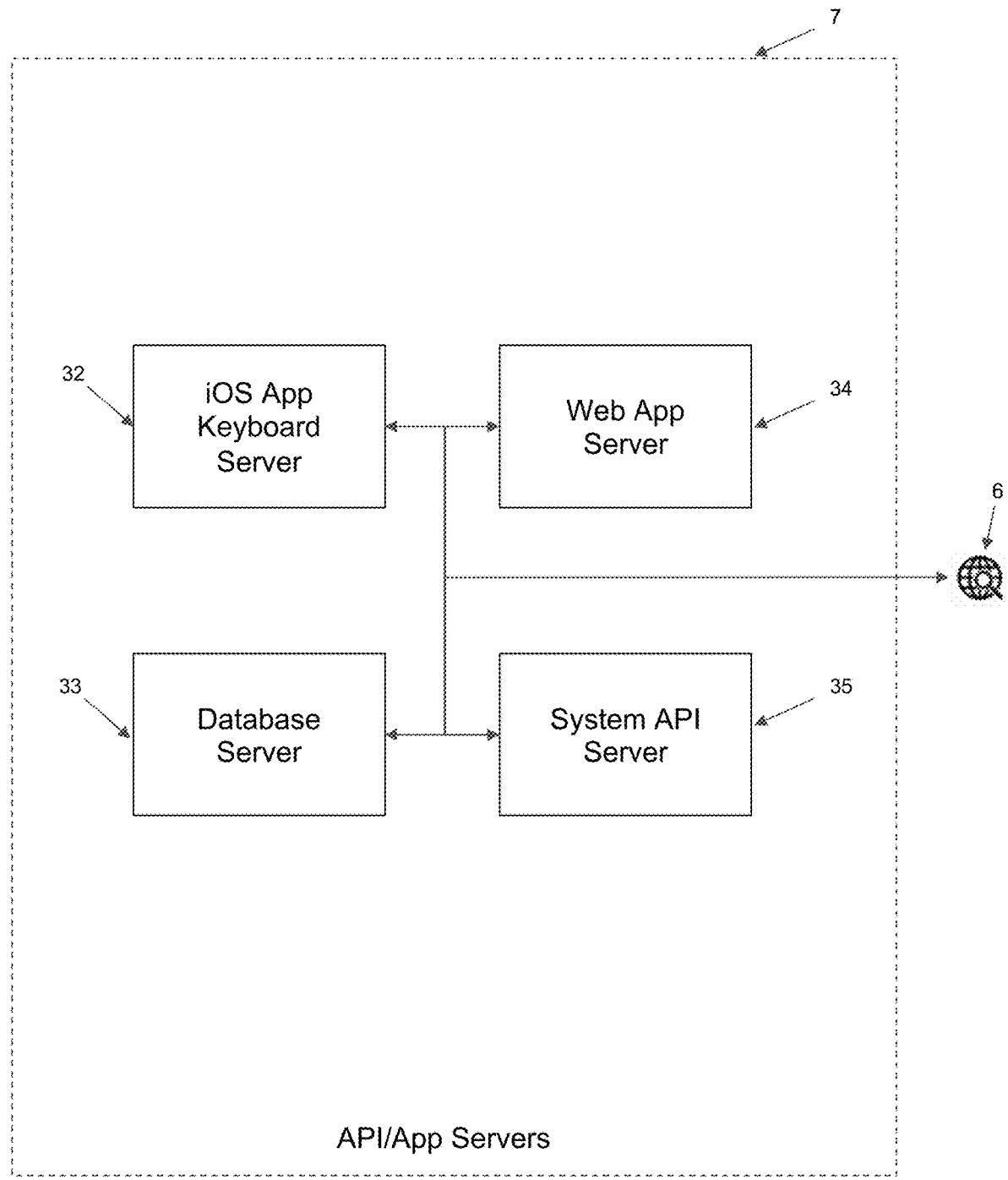
FIG. 6 is a block diagram of the API/app servers module.

FIG. 6 is a detailed block diagram of API/App Servers 7. This code functions to control the servers both for the mobile and web applications as well as provide API support for the various API requests made by the platform to public websites. iOS App/Keyboard server 32 provides server support for all the user iOS applications and extended keyboards. These server functions include sending and receiving data, storing new information in the database and perhaps most importantly distributing server process/computing across many servers on the internet. These servers also provide caching functionality so that the latest data set is stored at a variety of server locations across the internet and various geographies. This provides fast and reliable access for all users. Web app server 34 and database server 33 provide such server functionality for the web app and the database respectively. The system API server provides a cached version of API accessed content so that public APIs are not accessed too frequently. In many cases, these public APIs are not robust enough to be accessed on the order of magnitude necessary to support a mobile application.

Figure 7:
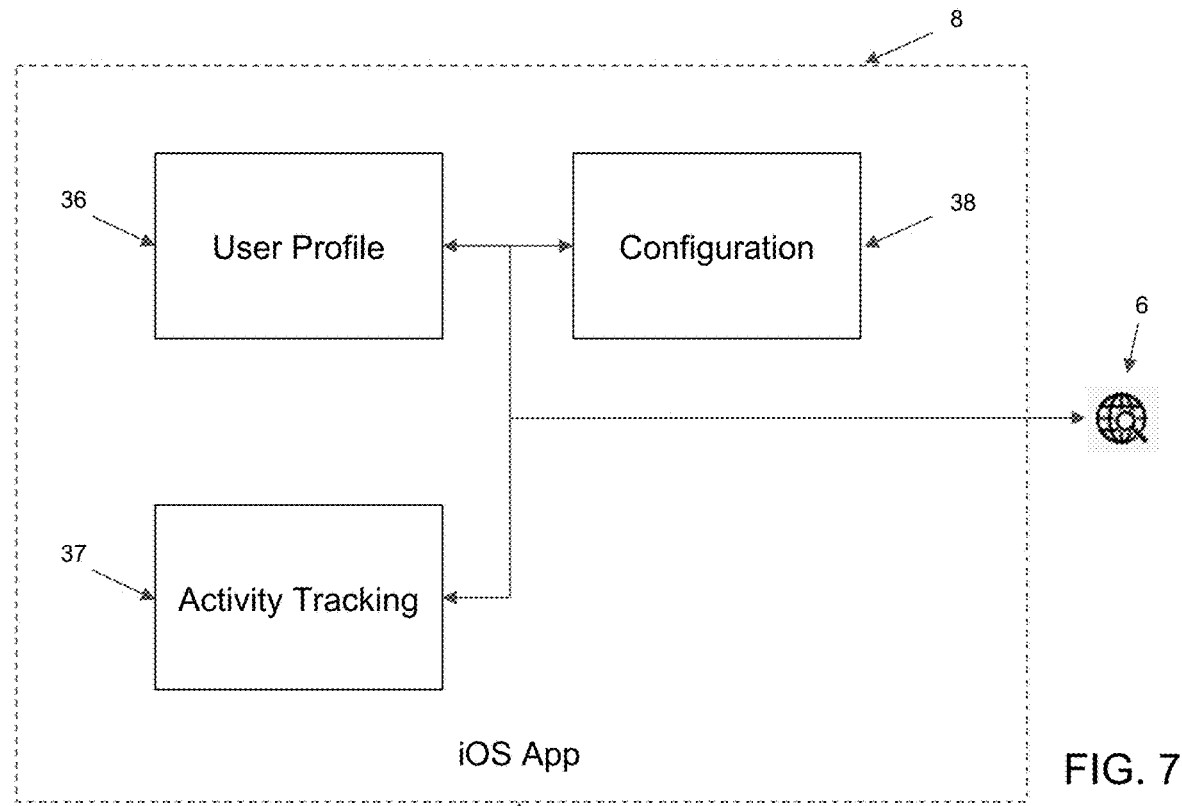
FIG. 7 is a block diagram of the iOS App.

FIG. 7 presents a block diagram of iOS app 8. The iOS app 8 user can build a specific user profile for their intelligent keyboard application in user profile 36. This includes typical information such as name, email address, phone number, photo, gender, sex, age, hobbies, interests, and education, including preferred conversational voice, tone, slang or other differentiators unique to their personal vocabulary. In addition to typical identifying information in the user profile, content created by the user with particular conversational words, responses and phrases can be stored as "favorites" or "bookmarks" in their user profile. In addition to the user profile assembled by the user, the system monitors the type of information the user engages with, the user's conversational tone and content and their specific responses in particular contexts. In this application, the term context means the computer application or software where the intelligent keyboard is deployed and the user is attempting to send a message or display content, such as email, texting/iMessage, calendar, dating applications, messaging apps such as Slack or another location where a user is using the intelligent keyboard to insert messages. As the user continues to use the intelligent keyboard, the system builds this user profile based on user behavior to improve the function and content prediction capability of the system. The system further attempts to match users to other similar users based on the similarity of their user profile. When user A has a high match rating with another similar user B, the system may serve content preferred by user A to user B and vice versa.

Activity tracking 37 monitors the activity of the user to build a stronger profile of the user. This information is used to build, improve and optimize the user profile described above. Activity tracking 37 specifically tracks the type of content engaged with by the user and in what contexts. Activity tracking 37 tracks the following interactions: which Categories and Intents are most and least used by a user, when users are most or least active during the day and week, how often a user accesses the intelligent keyboard during a period of time, engagement patterns over time including peaks and troughs throughout the year, and various internal improvements, such as the effect on user engagement of releasing new features or device notifications. This allows the system to more accurately predict the conversational phrases preferred by the user, but also to display additional equivalent and previously unused/under used, opening and response options. Thus activity tracking 37 can be utilized to build the behavior criteria utilized by the platform to suggest content. Configuration block 38 allows the user to control key features of the intelligent keyboard including keyboard activation, notifications and keyboard content including favorites, openers, banter, connect, disconnects and key questions. The intelligent keyboard configuration options are discussed in more detail in FIG. 12.

Figure 8:
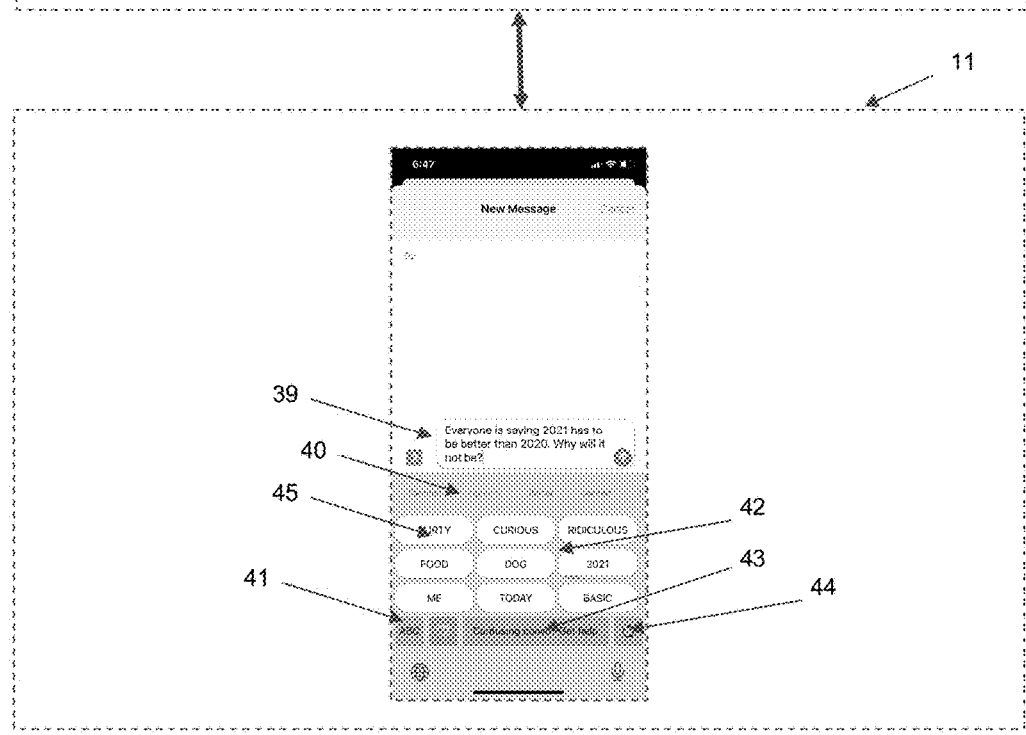
FIG. 8 is a screenshot of the intelligent keyboard.

FIG. 8 shows a screenshot of keyboard extension 11. Text input window 39 is the standard text input window from Apple iOS operating system for inputting text in a message or other text input fields. While the preferred embodiment is shown in reference to iOS, text input window 39 could be any text input window from any operating system, mobile or otherwise. Categories 40 shows the main categories of intelligent text available in the platform. In this view, the categories shown are: favorites, openers, banter and connect, but the preferred embodiment anticipates many other categories that are consistent with the invention disclosed including others like disconnect and "the 36 Q's." These categories organize the intelligent keyboard content into high level categories that assist the user in identifying content appropriate for the conversation type in which they are engaging.

Keyboard toggle 41 allows the user to toggle between keyboard types in iOS, including the intelligent keyboard, standard keyboard and other enabled keyboards. Intelligent keyboard content 42 is a listing of the suggested content for a specific category 40. The user will tap one of these content bubbles 45 to populate the text input window 39 with words and phrases. Help button 43 provides conversational guidance from the intelligent keyboard. Back button 44 inputs the most recently viewed content into the text input window 39 in reverse chronological order.

Figure 9:
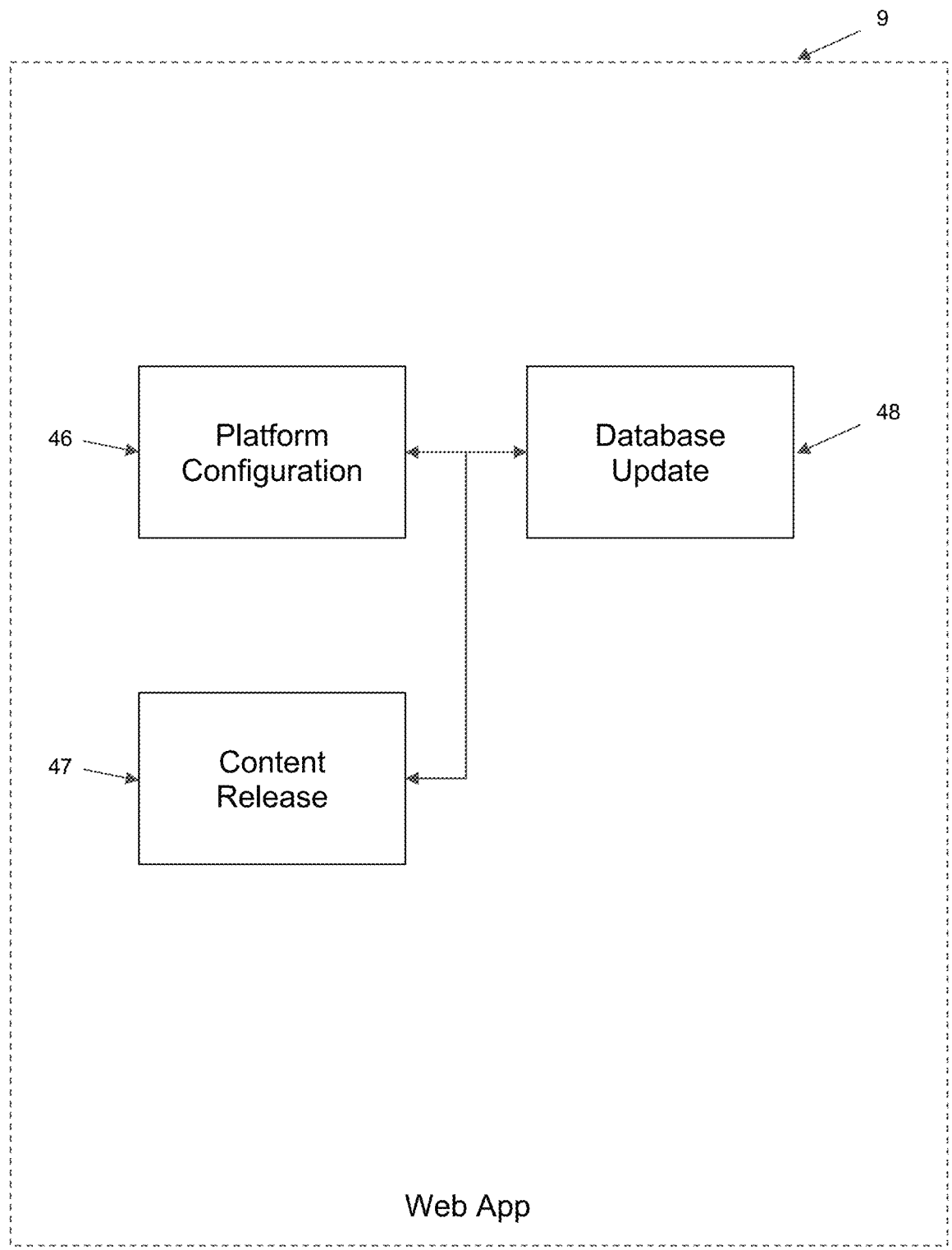
FIG. 9 is a block diagram of the web app.

FIG. 9 shows a block diagram of web app 9. Web app 9 is an administrative dashboard available only to the platform owners (not users) that allows editing and releasing content and setting configurations. Platform configuration 46 contains the key configurations for Artificial Intelligence Models and platform content, engagement limits, feature enabling or disabling, and notifications. Content release 47 allows the editing of existing content and creation of new content by platform owners. The block further allows a controlled "push" of new content to all the servers for delivery to platform users. Lastly database update 48 controls the orderly update of the key databases as shown in FIG. 10 based on new content, new configurations, new integrations or any new functionality that requires the update of the databases and/or database configurations.

Figure 10:
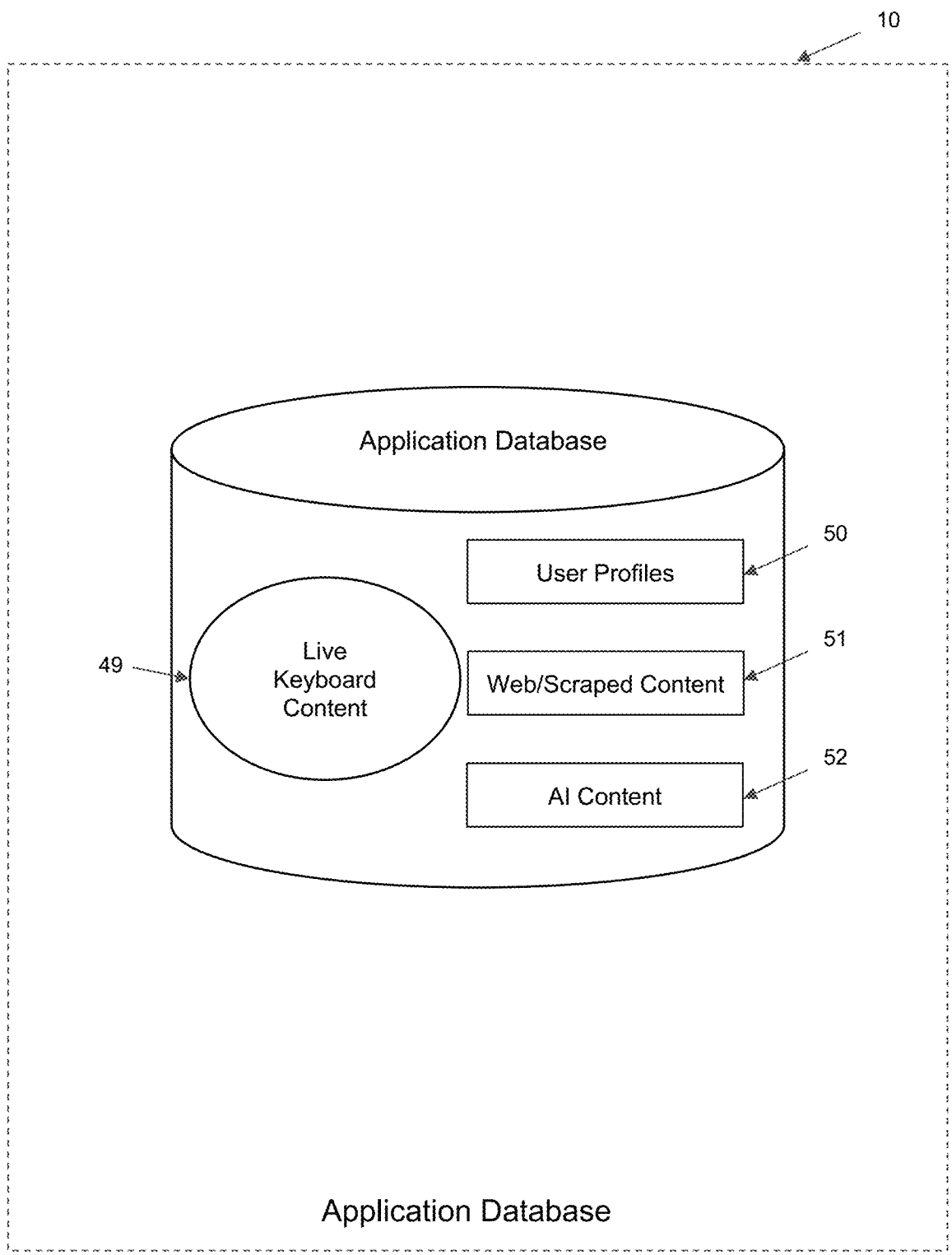
FIG. 10 is a block diagram application of the module database.

FIG. 10 shows detail of application database 10. Live keyboard content 49 contains AI generated content, user generated content and platform generated content. Live keyboard content 49 has been ranked by the system by popularity and tagged appropriately to be fetched and served to users in particular keyboard contexts and categories. The database is available globally via the internet so that access to mobile users is fast regardless of their physical location. The contents of the live keyboard content 49 database are managed by web app 9 and by the other functions of the system. Application database 10 also stores web/scraped content 51 that's gathered from web content 5 and integrations 4. Lastly application database 10 stores all generated AI content 52. This is content generated by Artificial Intelligence Models.

Figure 11:
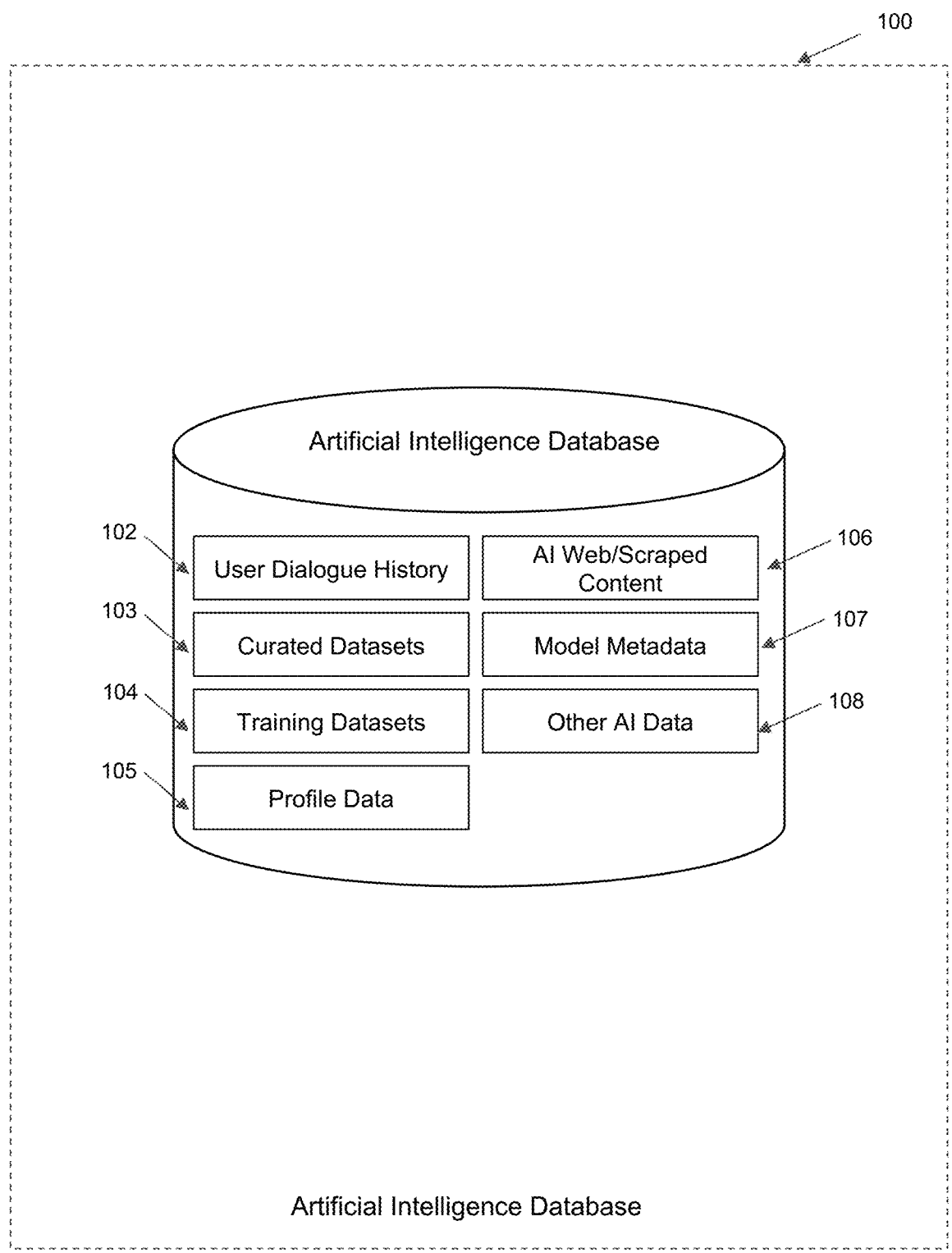
FIG. 11 is a block diagram of the artificial intelligence database.

FIG. 11 shows the details of the artificial intelligence database 100. Information stored in artificial intelligence database 100 is used to create, manage, train, deploy and maintain artificial intelligence models 3. User dialogue history 102 stores user conversations from the user of the specific instance of the intelligent keyboard. Curated datasets 103 are conversations that have been created by users or come from third-party sources, both of which have been edited by a human reviewer, usually for the purpose of processing them into training datasets 104. These curated data sets 103 are examples, selected by a human reviewer, that suit particular intents or conversation types. Training datasets 104 are curated example datasets that have been prepared for usage in training/fine-tuning artificial intelligence models 3 using machine learning. These training datasets 104 may be subsets or supersets of curated datasets 103 and are assembled both by human reviewers and modified, updated or refined by the artificial intelligence models 3. Profile data 105 is information about the user or user of the intelligent keyboard as well as data collected about the people to whom users are speaking. Profile data 105 may be incorporated into training datasets 104 to train and/or fine-tune artificial intelligence models 3 using machine learning. Profile data 105 may contain data from local user profile 36 and application database 10 such as, user profile 50 or profiles of people that users have spoken, including information acquired from third-party data providers. AI Web/Scraped Content 106 in the Artificial Intelligence Database 106 is any information relevant to building, evaluating or training/fine-tuning artificial intelligence Mmodels 3 obtained from the internet, including content collected in web content model 6 as described related to FIG. 5, specifically derived from Reddit, Instagram, Twitter as well as other third party apps. Each model in artificial intelligence models 3 has information about its architecture, parameters, performance, deployment, usage history, training/fine-tuning history, version and other details stored in model metadata 107. Miscellaneous data for the maintenance, deployment, use, training/fine-tuning of artificial intelligence models 3 is contained in other AI data 108.

Figure 12:
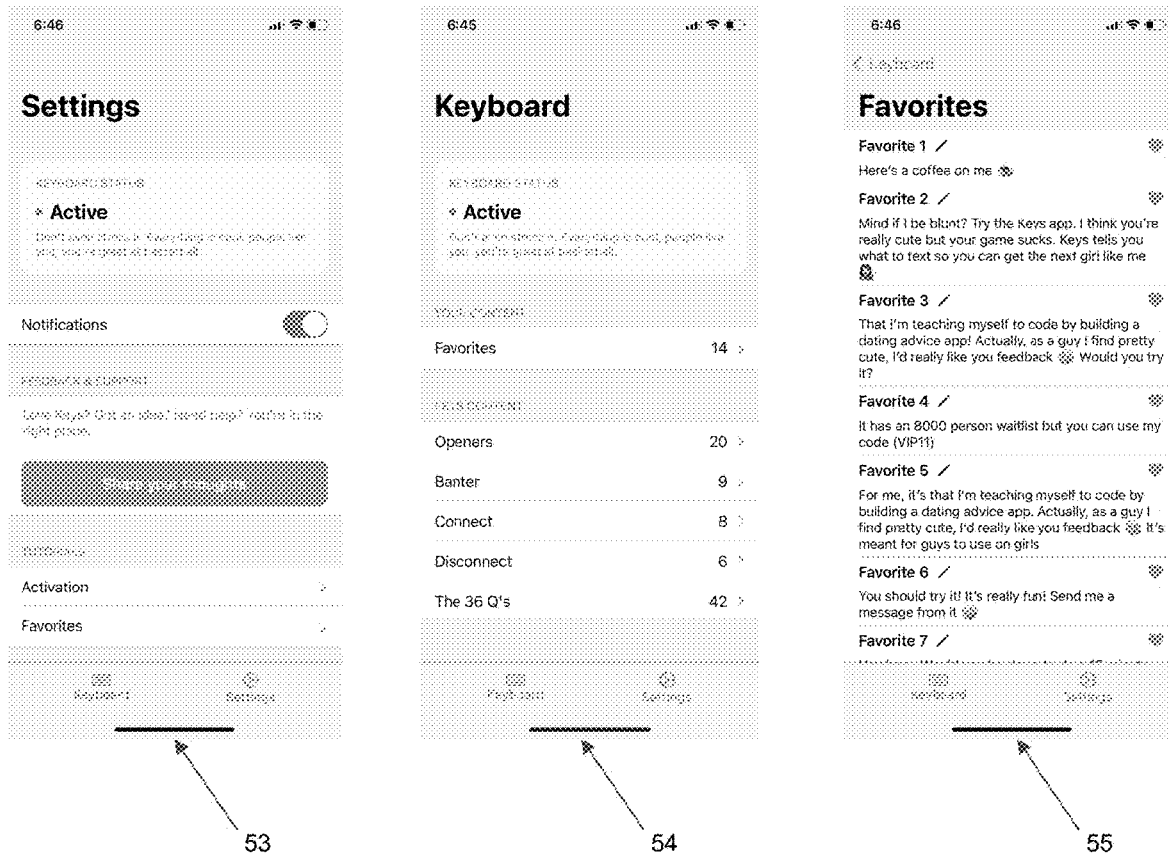
FIG. 12 shows screenshots of the iOS app configuration screens.

FIG. 12 shows screenshots of the various configuration screens of iOS app 8. Settings screen 53 allows the user to activate the intelligent keyboard, turn on/off notifications, get help and watch tutorials. Keyboard screen 54 allows the user to access categorized content such as favorites, openers, banter, connect, disconnect, "the 36 q's" and other categorized content. Favorites screen 55 allows the user to manage and edit their favorite content for the intelligent keyboard.

Figure 13:
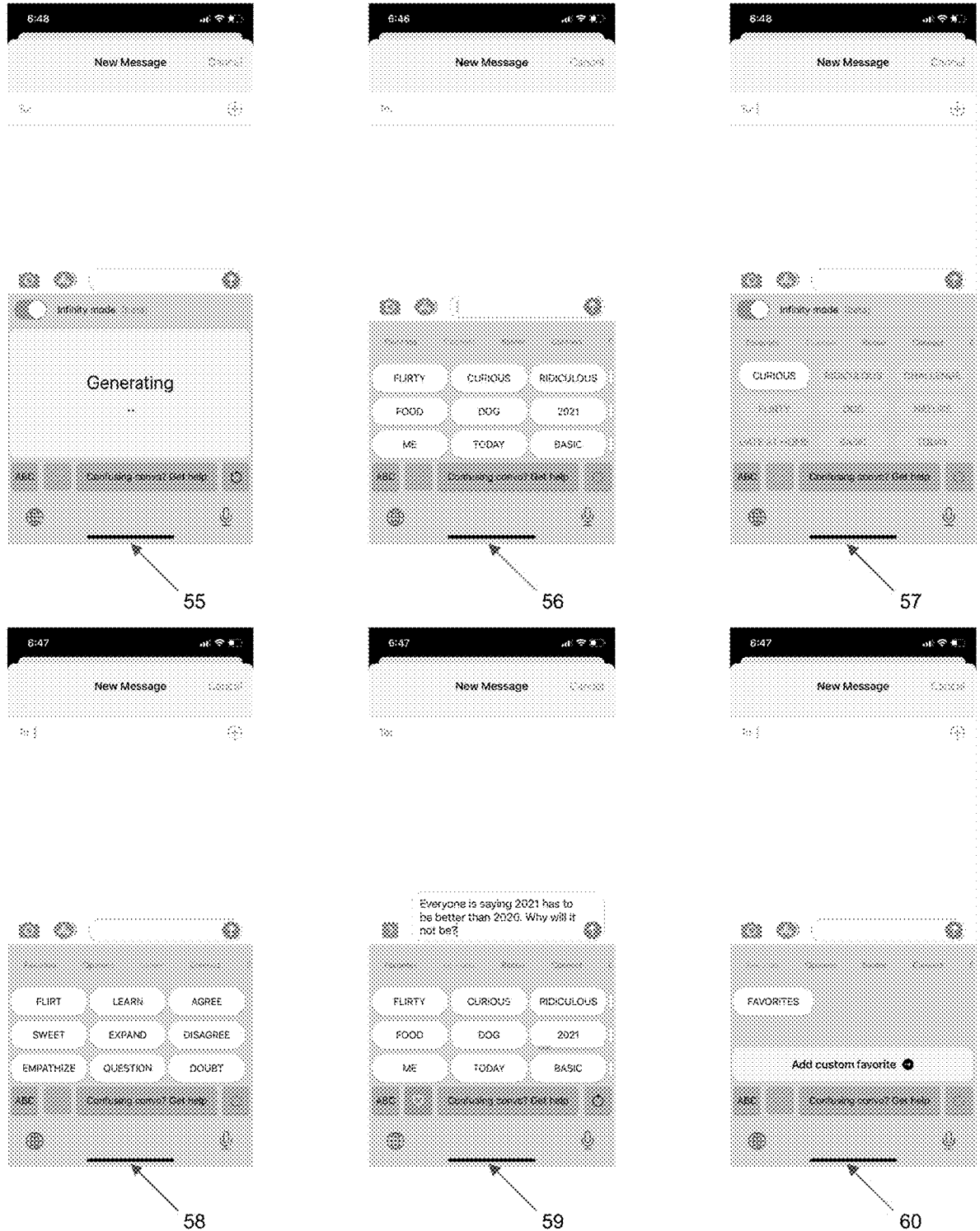
FIG. 13 shows screenshots of the various states of the intelligent keyboard.

FIG. 13 shows various screenshots of the actual live intelligent keyboard. Initial screen 55 shows the intelligent keyboard as it is generating keyboard content appropriate for the context, i.e. the application, text, email, etc. Category screen 56 shows the screen where the user has selected the opener category. Type screen 57 shows the "curious" Intent is ready to make a request for AI generated content from the API. Type screen 58 shows "banter" conversation type selected. Populate screen 59 shows the selected content populating the message window. Lastly favorites screen 60 shows the user's favorite keyboard content.

The intelligent keyboard has two modes: 1) Pro mode and 2) AI mode. In Pro mode, the keyboard content is written for the platform owners by experts in platform generated content 12 and stored in application database 10. In AI mode, all keyboard content is generated by artificial intelligence models 3. FIG. 13 outlines the user flow for Pro mode and FIG. 14 shows the user flow for AI mode.

Figure 14:
FIG. 14 shows screenshots of suggested phrases provided by the intelligent keyboard.
Figure 14:
Figure 14:
Figure 14:
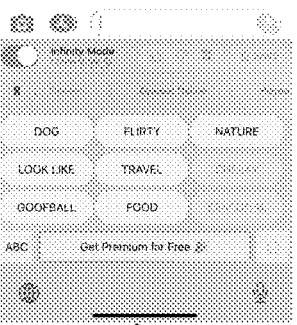
Figure 14:
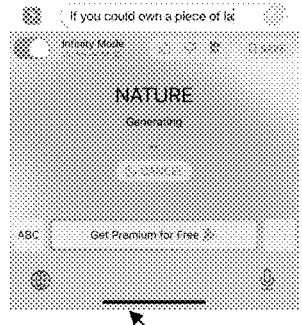
Figure 14:
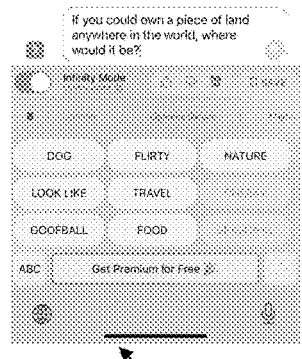
Figure 14:
Figure 14:
Figure 14:
Figure 14:
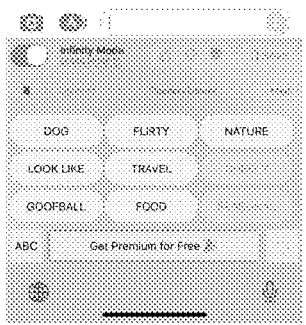
Figure 14:
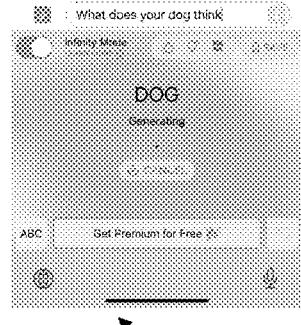
Figure 14:
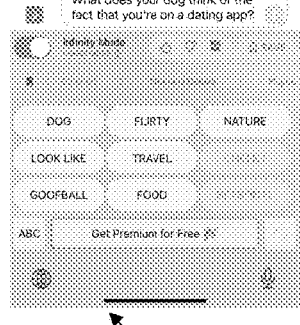

FIG. 14 shows screenshots of the intelligent keyboard application providing phrase suggestions based on various opening words. In step 79, the intelligent keyboard is in its opening state. The word "NATURE" is selected in step 80. At this point the intelligent keyboard begins generating text in the text box. Step 81 shows the fully generated text for "NATURE" plus the ability to select additional words for a new phrase. Step 82 shows the intelligent keyboard generating a phrase starting with the word "DOG." In this view, the phrase beginning to be generated in the text box is visible. Step 83 shows the fully generated suggested phrase for "DOG" plus other word selection options.

Figure 15:
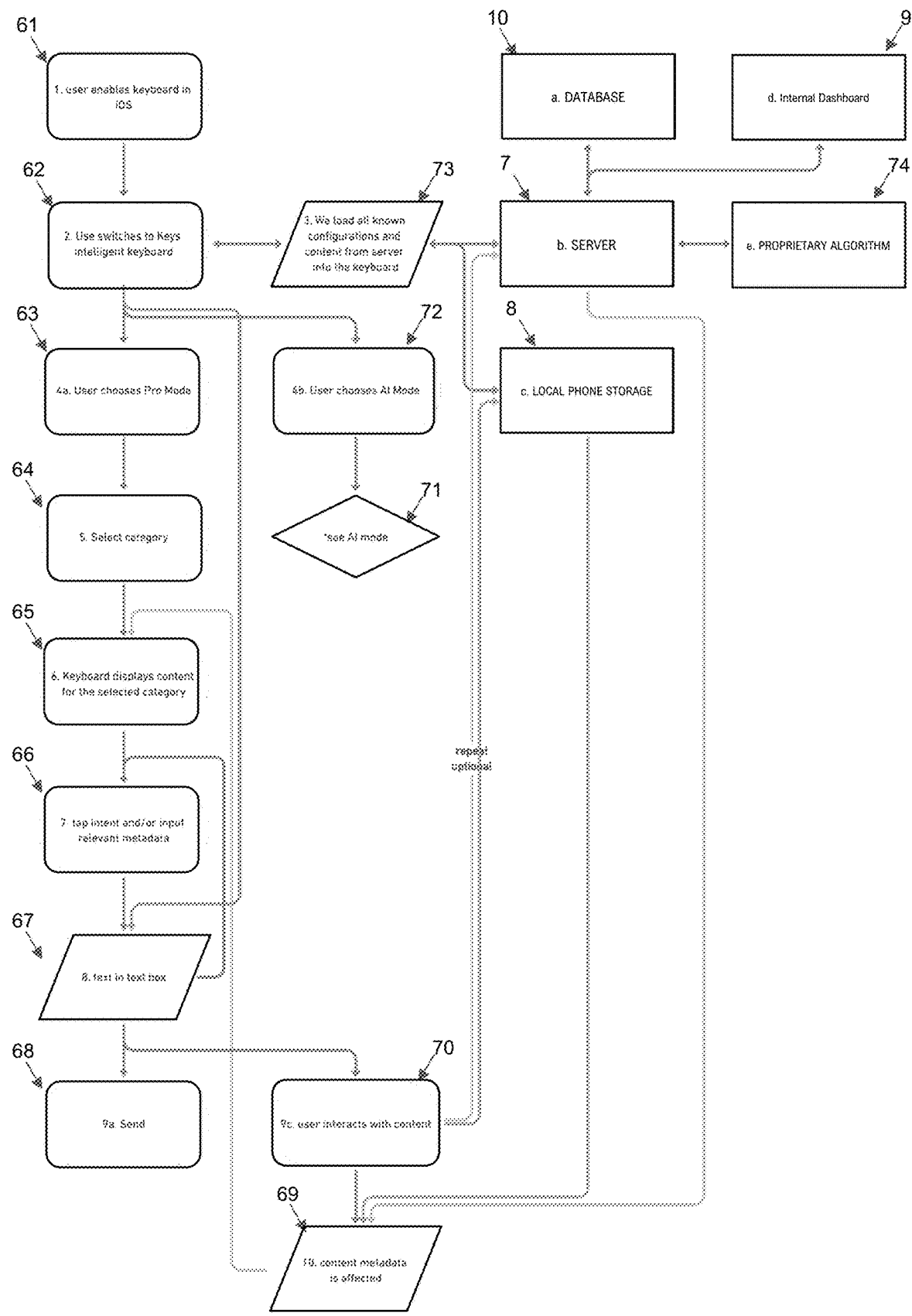
FIG. 15 shows a flow chart of the pro mode of the intelligent keyboard.

In FIG. 15, the user is selecting Pro mode for the intelligent keyboard. The user enables intelligent keyboard in iOS or another mobile operating system in step 61. When the user is inputting text in the keyboard of their mobile device, say in a text message, email or application, they have the option of switching to the intelligent keyboard in step 62. At this step, any text already typed in the text content box on the mobile device continues to be displayed in the text content box so that it can be added to the intelligent keyboard if the user so chooses.

Once the intelligent keyboard is activated, the user chooses the keyboard mode: Pro mode or AI mode. In step 63, the user selects Pro mode. In step 71, the user could select AI mode, which is shown in detail in FIG. 14. The user selects the category of content in 64. The categories are described earlier in this document but include Favorites, Advice, Openers, Banter, Connect/Disconnect and others. The keyboard displays the content for the selected category in step 65. The content loaded is determined, in part, by content metadata related to the context (i.e. text, email, app, etc.) checked in step 69, described in more detail below. After the category is selected, the keyboard displays the selected content for that category in step 65. In the next step 66, the user has the option of tapping an intent to display further related content, which is then displayed by intent. Intents include curious, ridiculous, flirty, dog, nature, challenge, basic, date at home and today. The user has the option to tap a chosen piece of content and add it in the text box in step 67. Content is sent in step 68.

While the user is selecting content in the above steps, the intelligent keyboard is monitoring the user's context, i.e. the location the keyboard is used, such as iMessage/SMS/text, email, dating apps, and others. The intelligent keyboard is also monitoring the keyboard content tapped, selected or sent by the user (user interaction). This information is passed to the system to optimize the content presented to the present user as well as other users of the intelligent keyboard. This first occurs at step 62 when the intelligent keyboard is enabled. At this step, all known configurations for the intelligent keyboard are loaded. These configurations are stored on the local user application 8, the servers 7 and application database 10. These configurations are updated in real time based on utilization of the intelligent keyboard by the present user and all users of the platform across the internet. Further, as a user interacts with content category step 65, intent step 66, text box step 67 and send step 68, the platform tracks this interaction and sends to ranking algorithm 14 and activity tracking 37. As this data is tracked, it is passed to database 10, web app 9 and to the system's proprietary algorithm 74. The activity data is processed and used to further optimize the content displayed to users in specific contexts, categories and intents. The system also monitors if any of the stored metadata is changed/updated/affected in step 69. These updates to metadata are generally due to user activity such as storing a favorite or interacting with content. These changes are routed through the system elements such as the user's local application storage 8, server 7, database 10, proprietary algorithm 74 and web application 9.

Figure 16:
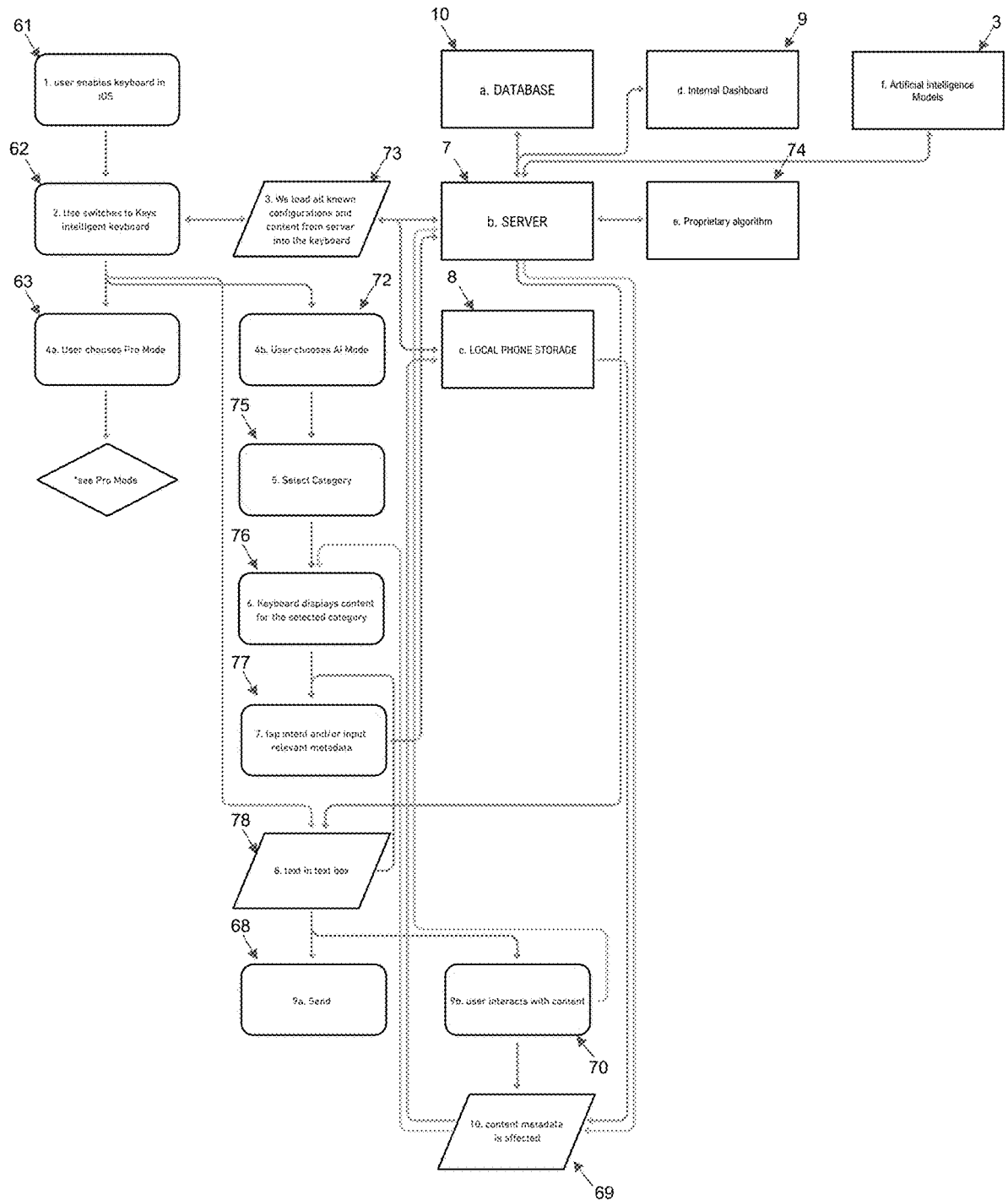
FIG. 16 shows a flow chart of the AI mode of the intelligent keyboard.

FIG. 16 shows the user selecting AI mode for the intelligent keyboard. Many of the steps are the same or overlap as with the Pro mode option and are described in detail in the discussion of FIG. 13. The user chooses AI mode in step 72. AI mode means that the artificial intelligence feature choses all the content presented to the user in the intelligent keyboard. A full discussion of artificial intelligence 3 is presented in relation to FIGS. 3 and 11 and accompanying discussion. As in Pro mode the user chooses the category in step 75. Content for the category is displayed in step 76. The user may select content at this step or select an intent in step 77. Text is copied in the text box in 78 and is sent by the user in step 69. As with Pro mode, the system monitors user behavior at each step of the process, including intent, category and tone, specifically monitoring user interactions and favorites of content. Additionally, at each stage of the process where new content is displayed for the user (category 75 and intent 77), the system sends information to artificial intelligence models 3 which generate AI content. These AI fetches are done based on system settings and data stored at server 7, database 10, artificial intelligence database 100, user application 8, web application 9 and proprietary algorithm 74.

Figure 17:
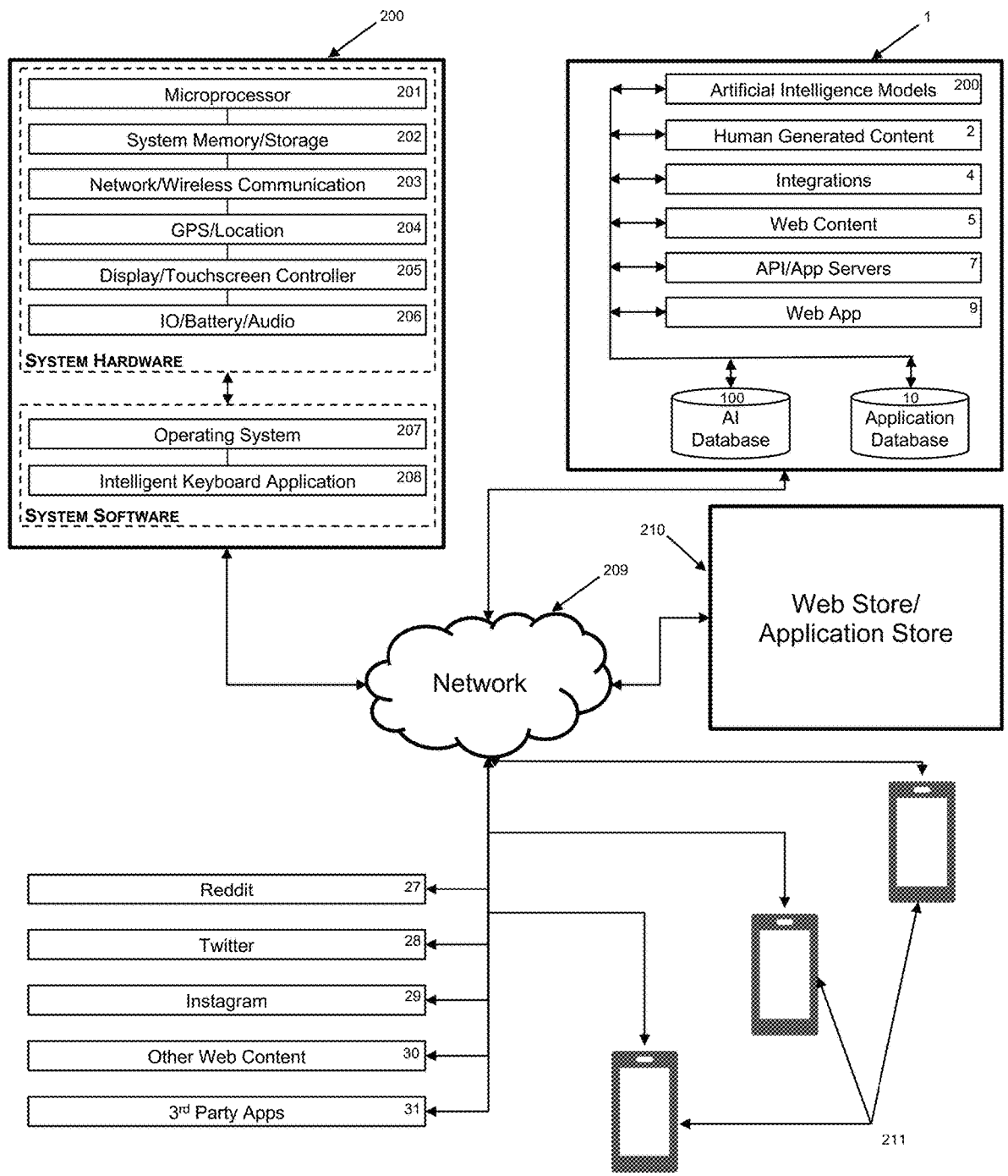
FIG. 17 shows a view of the complete intelligent keyboard system.

FIG. 17 shows a system implementation of the intelligent keyboard system 1 as described in the present disclosure. User device 200 could be any suitable computer system with a keyboard capable of running the software associated with intelligent keyboard 1, but for purposes of this disclosure a mobile phone such as an iPhone running Apple's iOS operating system or Android devices running Google's Android operating system are discussed. System hardware for such a mobile device includes microprocessor 201. Microprocessor 201 can any low power mobile optimized microprocessor known in the art, such as those manufactured by Apple, ARM, Intel and AMD. While those are suitable examples, any microprocessor capable of processing digital instructions could be utilized. System memory and storage 202 encompasses both non-volatile memory (that doesn't require a power to maintain memory) such as Flash memory that stores the operating system and applications as well as memory that's accessed by the microprocessor during execution of system operations. These memories are well known in the art. Network/wireless communication module 203 connects the device to the internet, either through any wired connection to the internet or any suitable wireless connection such as WiFi or 3G/4G/5G wireless connections through mobile carriers. This module provides connection to network 209 which, in this embodiment, is the internet. GPS/location module 204 provides location data generally using the global positioning system to pinpoint the user's location. Display/touchscreen controller 205 sends signals to the mobile device LCD or OLED (or other suitable technology) screen to render images and text on the screen. This controller further reads signals sent from the touchscreen relating to user interaction with the touchscreen. These controllers are well known in the art and any suitable one could be used, such as those in use in Apple iPhones or Google Android mobile devices. 10/battery/audio 206 controller interfaces with the mobile device battery, provides power management, input/output control for USB, Firewire, Bluetooth or other connected devices and the audio processor encodes and decodes digital audio signals so that they can be played back using analog speakers.

System software typically includes operating system 207, which in this case is generally Apple's iOS mobile operating system or Google's Android operating system. Any suitable operating system could be used, including Microsoft Window's, Apple MacOS, LINUX, Unix or any other operating system known in the art. Intelligent keyboard application 208 is the local version of the software running on a user's device. This version of the software displays the intelligent keyboard and stores the user's preferences as discussed previously in relation to FIG. 7.

The intelligent keyboard system 1 shows the remove servers related to the functions of the intelligent keyboard. These individual modules and databases have been discussed in depth in above, but this representation shows the remote nature of the server based software modules and databases. The software modules and databases can be executed on any suitable server connected to the internet, but in the preferred embodiment, servers hosted on Amazon Web Services are utilized. The intelligent keyboard application 208 communicates through network 209 to servers that host intelligent keyboard system 1. These servers further communicate through network 209 with the various internet services discussed prior including Reddit 27, Twitter 28, Instagram 29, other suitable web content 30 and $3^{rd}$ party apps 31.

Third party user devices 211 also connect through network 209. These are other user devices that receive communications from the user of the intelligent keyboard application. While the figure indicates that third party user devices 211 are mobile phones, such devices could also be desktop or mobile computers receiving communication.

Lastly, web store/application store 210 is connected to network 209 and thus to user device 200. In the preferred embodiment, web store/application store 210 is an online store for downloadable applications or other downloadable content such as the Apple App Store or Google Play Store. While this aspect of the intention is described in relation to these existing web store/application store 210, any suitable type of online marketplace could be utilized. Here, the user could download the intelligent keyboard application 208 or paid extensions to the intelligent keyboard application 208. It is anticipated that libraries of keyboard content in particular voices could be sold in app for purchase and download through these web store/application stores 210.

Although the present invention has been described in relation to the above disclosed preferred embodiment, many modifications in design, implementation, systems and execution are possible while still maintaining the novel features and advantages of the invention. The preferred embodiment is not meant to limit the scope of the patent in any way, and it should be given the broadest possible interpretation consistent with the language of the disclosure on the whole.

The invention claimed is:

1. An intelligent keyboard for sending suggested messages through a computing device comprising:
   An intelligent keyboard application for use on a computer system and display on a computer screen, the intelligent keyboard for use by a user to generate a message to be sent by the computer system, the intelligent keyboard comprising
   a message insertion location to insert the message generated by the intelligent keyboard,
   a category selection window, wherein the user may select a category for the message to be sent,
   an intent selection window, wherein the user may select an intent for the message to be sent, and
   a suggested message window where a set of one or more suggested messages are displayed, wherein the user may select and send one of the set of suggested messages via the computer system;
   wherein the set of one or more suggested messages is selected by a selection criteria by the computer system from one or more message data databases comprising:
   a human generated content database, the human generated content database comprising message data further comprising platform generated content generated by an operator of the intelligent keyboard application and user generated content generated by all users of the intelligent keyboard application,
   an integrations database, the integrations database comprising message data collected from one or more applications linked to the intelligent keyboard application by the user,
   a web content database, the web content database comprising message data collected from one or more internet sites, and
   an artificial intelligence content database, the artificial intelligence content database comprising message data generated by artificial intelligence models utilizing machine learning to generate human natural language responses.

2. The intelligent keyboard of claim 1 where the one or more applications of the integrations database are chosen from the set of email, maps, text messages, iMessage, search history, calendar and contacts.

3. The intelligent keyboard of claim 1 where the one or more internet sites from the web content database are chosen from the set of Reddit, Twitter and Instagram.

4. The intelligent keyboard of claim 1 where the selection criteria includes utilizing the context of the message to be sent and a set of behavior criteria related to the user.

5. A system for an intelligent keyboard for sending suggested messages comprising:
   a computing device comprising a microprocessor, a memory, a display controller, a means for communication with a network, an operating system and an intelligent keyboard application, the intelligent keyboard application for use by a user to generate a message to be sent by the computer system, the intelligent keyboard comprising:
   a message insertion location to insert the message generated by the intelligent keyboard,
   a category selection window, wherein the user may select a category for the message to be sent,
   an intent selection window, wherein the user may select an intent for the message to be sent,
   an application database comprising a user profile and a local database of message data, and
   a suggested message window where a set of one or more suggested messages are displayed, wherein the user may select and send one of the set of suggested messages via the computer system and the network, wherein the set of one or more suggested messages is selected by a selection criteria by the computer system from one or more message data databases comprising:
   a human generated content database, the human generated content database comprising message data further comprising platform generated content generated by an operator of the intelligent keyboard application and user generated content generated by all users of the intelligent keyboard application, an integrations database, the integrations database comprising message data collected from one or more applications linked to the intelligent keyboard application by the user, a web content database, the web content database comprising message data collected from one or more internet sites, an artificial intelligence content database, the artificial intelligence content database comprising message data generated by artificial intelligence models utilizing machine learning to generate human natural language responses, and the application database, wherein the network is configured for transmitting data between computer systems, and a remote server computer system connected to the network, the remote server hosting the human generated content database, the integrations database, the web content database and the artificial intelligence content database.

6. The system for an intelligent keyboard of claim 5 where the one or more applications of the integrations database are chosen from the set of email, maps, text messages, iMessage, search history, calendar and contacts.

7. The system for an intelligent keyboard of claim 5 where the one or more internet sites from the web content database are chosen from the set of Reddit, Twitter and Instagram.

8. The system for an intelligent keyboard of claim 5 where the selection criteria includes utilizing the context of the message to be sent and a set of behavior criteria related to the user.

9. A method of generating suggested messages for sending by a user using an intelligent keyboard application through a computer system comprising:

displaying, on a display of the computer system an intelligent keyboard, the intelligent keyboard comprising:

a message insertion location to insert the message generated by the intelligent keyboard, a category selection window, wherein the user may select a category for the message to be sent, an intent selection window, wherein the user may select an intent for the message to be sent, and a suggested message window where a set of one or more suggested messages are displayed, wherein the user may select and send one of the set of suggested messages via the computer system;

generating a set of one or more suggested messages for sending by the user, the one or more suggested messages selected by a selection criteria by the computer system from one or more message data databases comprising:

a human generated content database, the human generated content database comprising message data further comprising platform generated content generated by an operator of the intelligent keyboard application and user generated content generated by all users of the intelligent keyboard application, an integrations database, the integrations database comprising message data collected from one or more applications linked to the intelligent keyboard application by the user, a web content database, the web content database comprising message data collected from one or more internet sites, and an artificial intelligence content database, the artificial intelligence content database comprising message data generated by artificial intelligence models utilizing machine learning to generate human natural language responses, displaying the set of one or more suggested messages on the display, and selecting, by the user one of the suggested messages for sending by the computer system.

10. The method of generating suggested messages for sending by a user using an intelligent keyboard application of claim 9 where the one or more applications of the integrations database are chosen from the set of email, maps, text messages, iMessage, search history, calendar and contacts.

11. The method of generating suggested messages for sending by a user using an intelligent keyboard application of claim 9 where the one or more internet sites from the web content database are chosen from the set of Reddit, Twitter and Instagram.

12. The method of generating suggested messages for sending by a user using an intelligent keyboard application of claim 9 where the selection criteria includes utilizing the context of the message to be sent and a set of behavior criteria related to the user.

* * * * *